United States Patent
Dudar et al.

(10) Patent No.: US 11,970,989 B2
(45) Date of Patent: Apr. 30, 2024

(54) METHOD AND SYSTEM FOR IMPROVING EVAPORATIVE EMISSIONS OF A VEHICLE

(71) Applicant: Ford Global Technologies, LLC, Dearborn, MI (US)

(72) Inventors: Aed Dudar, Canton, MI (US); Dennis Yang, Canton, MI (US); Jonathan Bauer, Belleville, MI (US); Kenneth Pifher, Taylor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/811,815

(22) Filed: Jul. 11, 2022

(65) Prior Publication Data

US 2024/0011448 A1 Jan. 11, 2024

(51) Int. Cl.
*F02D 41/00* (2006.01)
*B01D 53/04* (2006.01)
*F02D 41/38* (2006.01)
*F02M 25/08* (2006.01)

(52) U.S. Cl.
CPC ..... *F02D 41/0045* (2013.01); *B01D 53/0415* (2013.01); *F02D 41/0042* (2013.01); *F02D 41/38* (2013.01); *F02M 25/0836* (2013.01); *F02M 25/0854* (2013.01); *B01D 2253/102* (2013.01); *B01D 2257/702* (2013.01); *B01D 2259/4516* (2013.01); *B01D 2259/4566* (2013.01); *F02D 2200/0602* (2013.01)

(58) Field of Classification Search
CPC .. F02D 41/0045; F02D 41/0042; F02D 41/38; F02D 2200/0602; B01D 53/0415; B01D 2253/102; B01D 2257/702; B01D 2259/4516; B01D 2259/4566; F02M 25/0836; F02M 25/0854
See application file for complete search history.

(56) References Cited

U.S. PATENT DOCUMENTS

| | | | |
|---|---|---|---|
| 6,357,288 B1 * | 3/2002 | Shigihama | F02M 25/0809 73/49.7 |
| 10,138,846 B1 | 11/2018 | Dudar | |
| 11,111,885 B2 | 9/2021 | Dudar | |
| 2003/0019286 A1 * | 1/2003 | Wakahara | F02M 25/0809 73/114.39 |
| 2005/0056262 A1 | 3/2005 | Osanai | |
| 2011/0265768 A1 * | 11/2011 | Kerns | F02M 25/089 123/521 |
| 2015/0114350 A1 * | 4/2015 | Pursifull | F02M 35/10157 123/445 |
| 2015/0211914 A1 * | 7/2015 | Dudar | B60K 15/03006 73/292 |
| 2016/0131055 A1 * | 5/2016 | Jeffrey | F02M 25/0836 123/478 |

(Continued)

*Primary Examiner* — Phutthiwat Wongwian
*Assistant Examiner* — Susan E Scharpf
(74) *Attorney, Agent, or Firm* — Vincent Mastrogiacomo; McCoy Russell LLP

(57) ABSTRACT

Methods and systems are presented for improving operation of an evaporative emissions system. In one example, the methods and systems estimate a fuel vapor concentration based on output of a fuel tank level sensor and output of a fuel pressure sensor. A canister purge valve is adjusted to an initial position at a beginning of a fuel vapor purging cycle to reduce a fuel vapor purging time.

9 Claims, 5 Drawing Sheets

(56) References Cited

U.S. PATENT DOCUMENTS

| | | | |
|---|---|---|---|
| 2016/0201613 A1* | 7/2016 | Ulrey | F02M 25/089 |
| | | | 123/520 |
| 2016/0201615 A1* | 7/2016 | Pursifull | F02D 41/26 |
| | | | 123/520 |
| 2016/0215714 A1* | 7/2016 | Yang | G01F 22/02 |
| 2016/0215715 A1* | 7/2016 | Dudar | F02M 25/089 |
| 2016/0312718 A1* | 10/2016 | Dudar | F02D 41/021 |
| 2019/0101072 A1 | 4/2019 | Dudar | |
| 2020/0386193 A1 | 12/2020 | Dudar | |

* cited by examiner

| | | 510 | 512 | 514 | 516 | 518 |
|---|---|---|---|---|---|---|
| 502 → | Fuel Tank Pressure | 20 | 30 | 40 | 50 | 60 |
| 504 → | Fuel storage canister bias | 0.02 | 0.025 | 0.035 | 0.042 | 0.05 |

| | | 610 | 612 | 614 | 616 | 618 |
|---|---|---|---|---|---|---|
| 602 → | Fuel Fill Amount | 5 | 10 | 15 | 20 | 25 |
| 604 → | Fuel storage canister bias | 0.05 | 0.08 | 0.12 | 0.18 | 0.22 |

METHOD AND SYSTEM FOR IMPROVING EVAPORATIVE EMISSIONS OF A VEHICLE

FIELD

The present description relates generally to methods and systems for purging fuel vapors that are stored in a carbon filled fuel vapor storage canister.

BACKGROUND/SUMMARY

A vehicle may include a carbon filled fuel vapor storage canister. The carbon filled fuel vapor storage canister may store fuel vapors when liquid fuel in a fuel tank is heated via diurnal heating. The carbon filled fuel vapor storage canister may also store fuel vapors when the fuel tank is being filled so that the fuel vapors do not escape to atmosphere. The carbon filled fuel vapor storage canister may be purged from time to time so that the canister does not overflow with fuel vapors. In order to purge the carbon filled fuel vapor storage canister, the engine is activated so that the excess fuel vapors may be drawn into and combusted in the engine. To begin purging the canister of fuel vapors, a canister purge valve may be gradually opened so that the concentration of fuel vapors that are stored in the canister may be learned. Learning the concentration of fuel vapors may help to reduce a possibility of the engine running too lean or too rich. However, learning the concentration of fuel vapors increases an amount of time it takes to purge the carbon filled fuel vapor storage canister of fuel vapors. In addition, with hybrid vehicles, there may be fewer opportunities to run the engine, and when the engine does run, the engine run duration may be too short to completely purge the carbon filled fuel vapor storage canister of fuel vapors.

The inventors herein have recognized the above-mentioned issue and have developed a method for operating an evaporative emissions system, comprising: estimating a concentration of fuel vapors stored in a carbon filled fuel vapor storage canister via a controller based on conditions when fuel vapors from the carbon filled fuel vapor storage canister do not flow to an engine; and adjusting operation of an engine via the controller according to the concentration of fuel vapors.

By adjusting operation of an engine according to a concentration of fuel vapors that was estimated when fuel vapors were not flowing to an engine, it may be possible to provide the technical result of improving operation of an evaporative emissions system. In particular, the fuel vapor concentration that is determined when fuel vapors are not flowing to an engine may be applied at a beginning of a fuel vapor purging process so that the evaporative emissions system may learn a final value of a fuel vapor concentration in the carbon filled fuel vapor storage canister sooner. Consequently, a canister purge valve may achieve a fully open position earlier in a canister fuel vapor purge sequence with a lower possibility of operating the engine leaner or richer than may be desired. As a result, it may take less time to purge fuel vapors from the carbon filled fuel vapor storage canister so that a possibility of overfilling the carbon filled canister may be reduced.

The present description may provide several advantages. In particular, the approach may allow fuel vapors to be purged from a carbon filled canister in a shorter period of time than prior art approaches. Additionally, the approach may reduce a possibility of operating an engine richer or leaner than may be desired during fuel vapor purging. Further, the approach may improve operation of a canister purge valve and fuel injectors during purging of fuel vapors from a carbon filled fuel vapor storage canister.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 5 and 6 show example tables for estimating a concentration of fuel vapor stored in a carbon filled fuel vapor storage canister.

DETAILED DESCRIPTION

Figure 1:
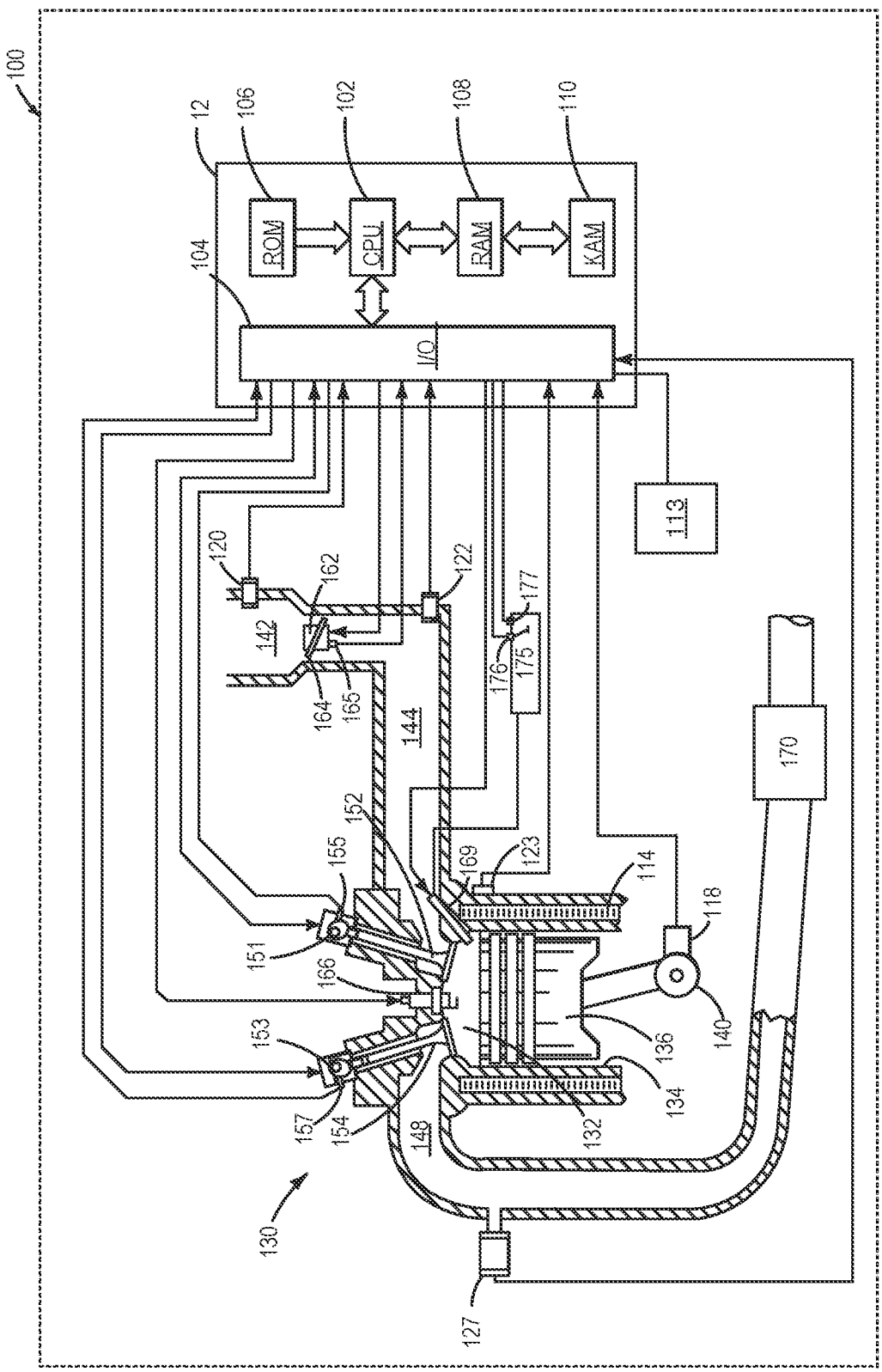
FIG. 1 shows an example engine to which an evaporative emissions system may be coupled.
Figure 2:
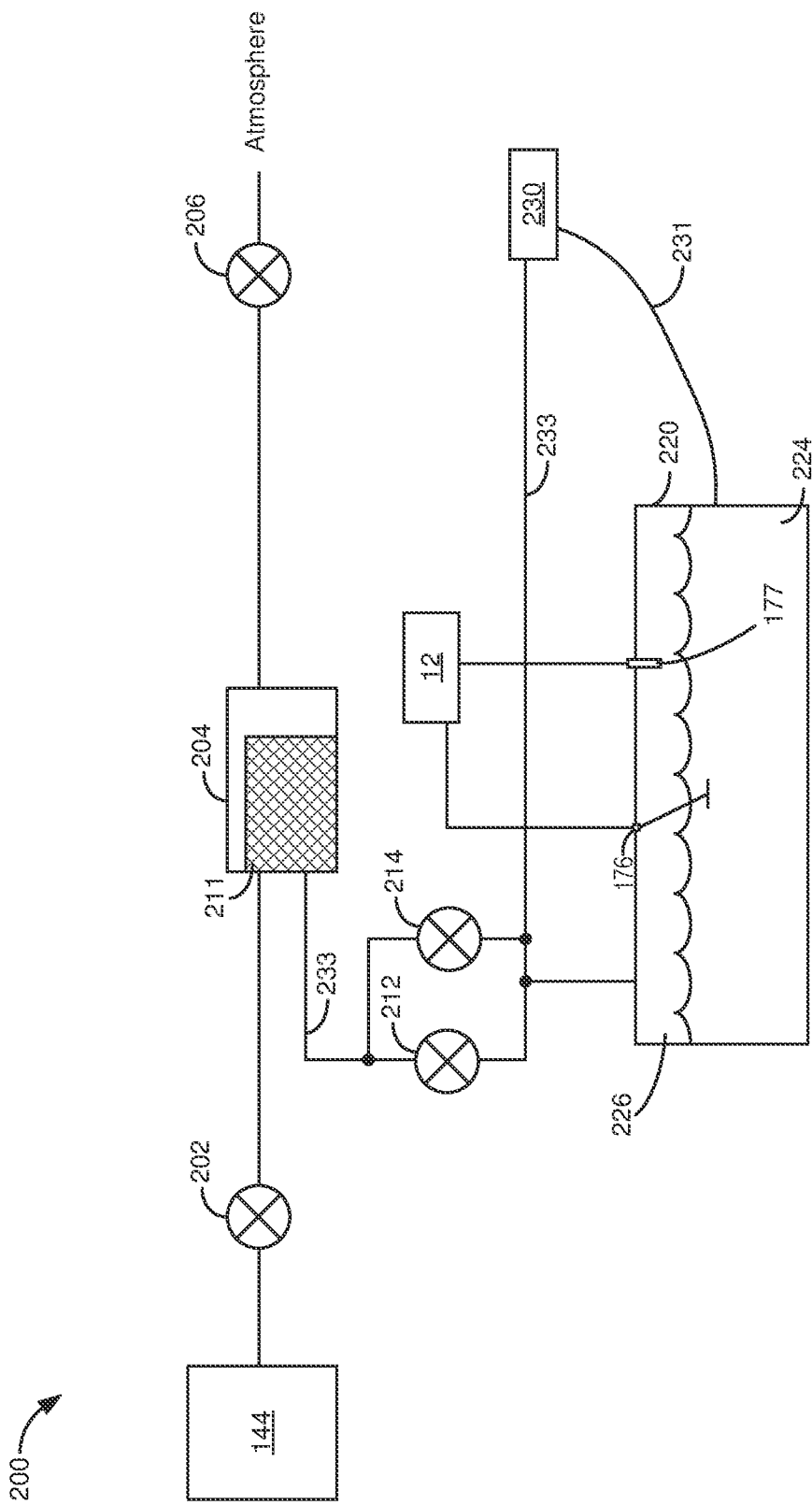
FIG. 2 shows an example evaporative emissions system.
Figure 3:
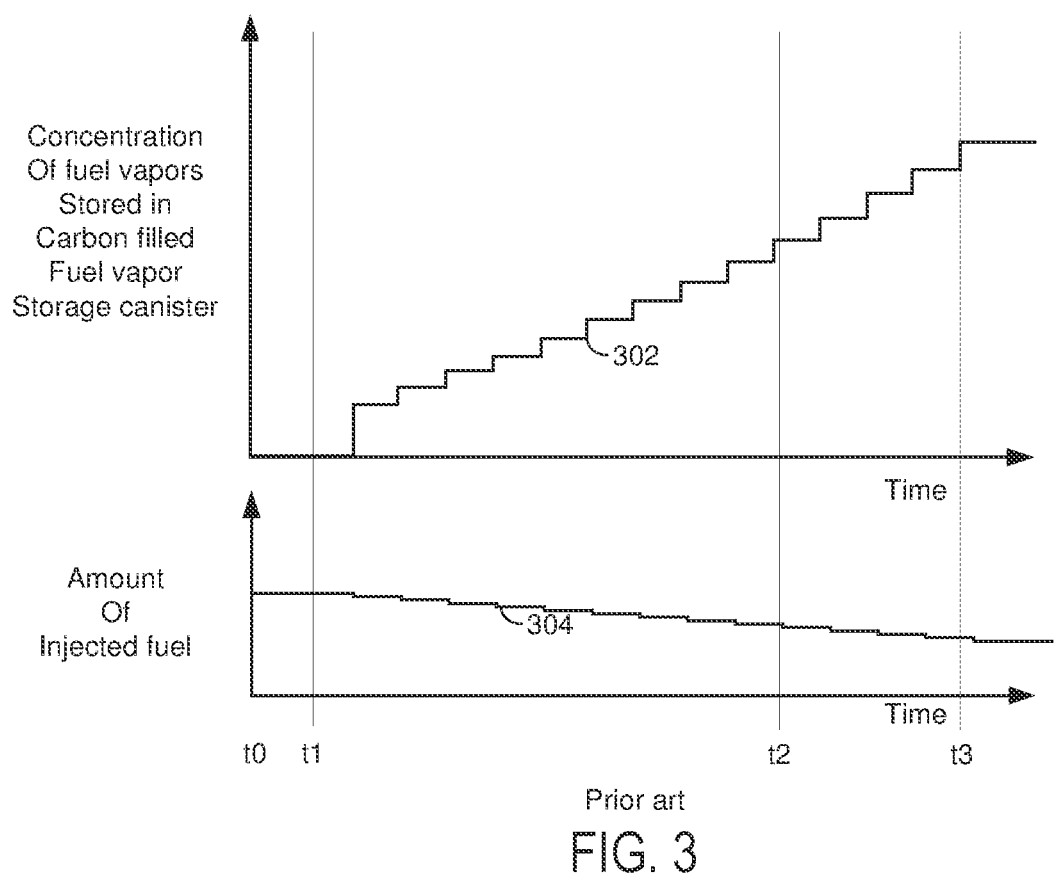
FIGS. 3 and 4 show examples of learning fuel vapor concentration during purging of a carbon filled fuel vapor storage canister.
Figure 4:
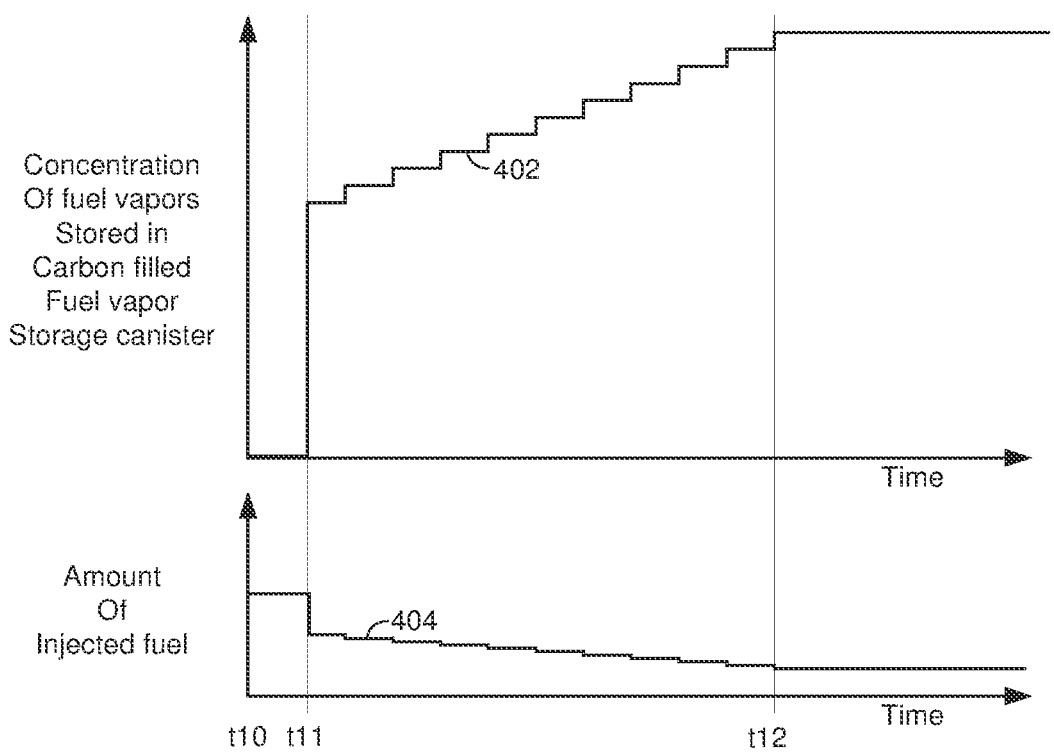
Figure 7:
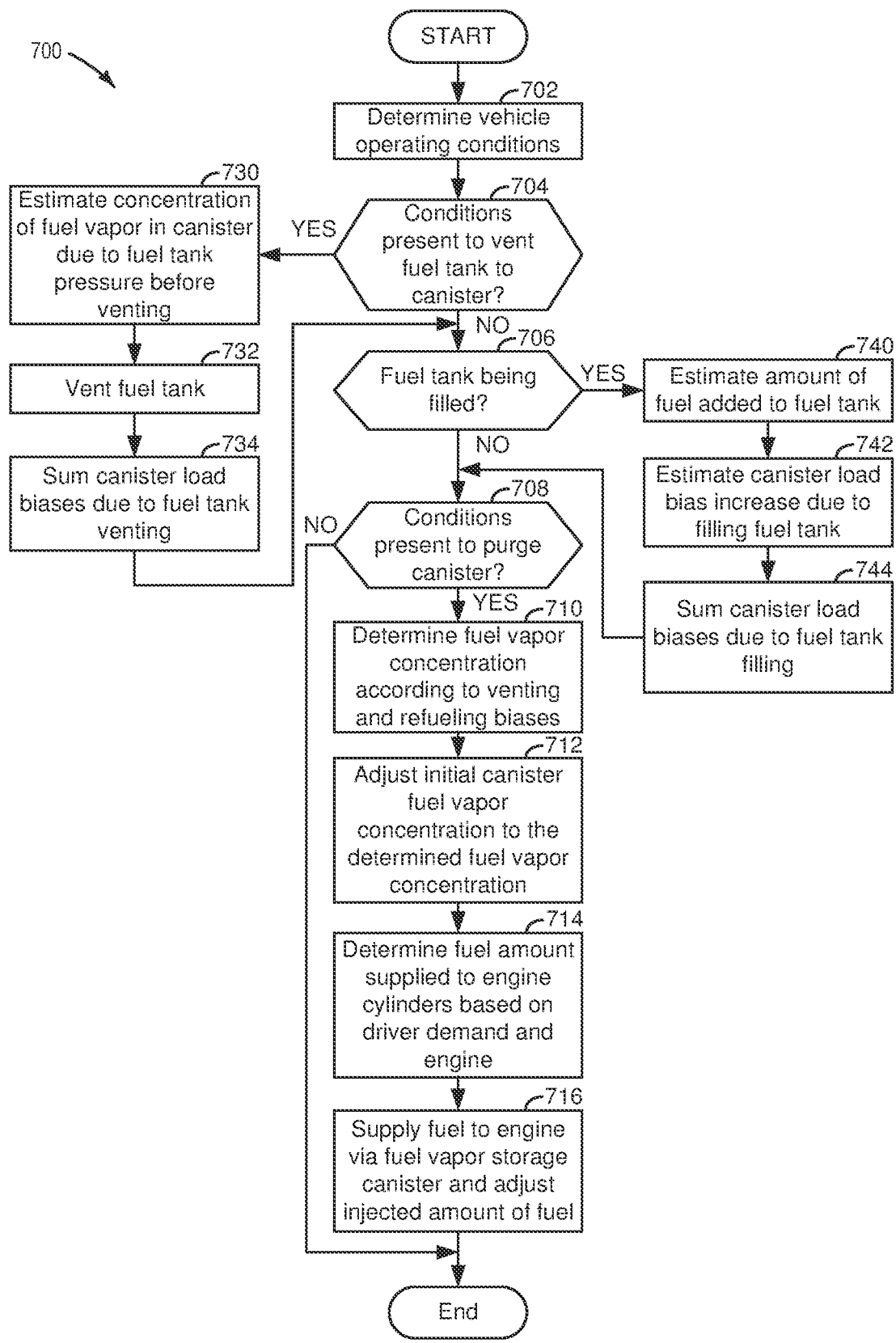
FIG. 7 shows an example method for operating an evaporative emissions system.

The following description relates to systems and methods for operating an evaporative emissions system of a vehicle. The vehicle may be a hybrid vehicle or a non-hybrid vehicle. The vehicle may include an engine of the type that is shown in FIG. 1. An evaporative emissions system of the type shown in FIG. 2 may be coupled to the engine. A prior art fuel concentration learning sequence is shown in FIG. 3. A fuel concentration learning sequence according to the present method is shown in FIG. 4. Example tables or mappings of fuel vapor concentration values are shown in FIGS. 5 and 6. Finally, a method for operating an evaporative emissions system is shown in FIG. 7.

Referring now to FIG. 1, vehicle 100 includes an internal combustion engine 130. In this example, the engine is a multi-cylinder spark ignition internal combustion engine. FIG. 1 is a schematic diagram that shows one cylinder of internal combustion engine 130. Internal combustion engine 130 may be controlled at least partially by a control system including a controller 12.

A combustion chamber 132 of the internal combustion engine 130 may include a cylinder formed by cylinder walls 134 with a piston 136 positioned therein. The piston 136 may be coupled to a crankshaft 140 so that reciprocating motion of the piston is translated into rotational motion of the crankshaft. The crankshaft 140 may be coupled to at least one drive wheel of a vehicle via an intermediate transmission system. Further, a starter motor (not shown) may be coupled to the crankshaft 140 via a flywheel to enable a starting operation of the engine 130.

Combustion chamber 132 may receive intake air from an intake manifold 144 via an intake passage 142 and may exhaust combustion gases via an exhaust passage 148. The intake manifold 144 and the exhaust passage 148 can selectively communicate with the combustion chamber 132 via respective intake valve 152 and exhaust valve 154. In some examples, the combustion chamber 132 may include two or more intake valves and/or two or more exhaust valves.

In this example, the intake valve 152 and exhaust valve 154 may be controlled by cam actuation via respective cam actuation systems 151 and 153. The cam actuation systems 151 and 153 may each include one or more cams and may utilize one or more of cam profile switching (CPS), variable cam timing (VCT), variable valve timing (VVT), and/or variable valve lift (VVL) systems that may be operated by the controller 12 to vary valve operation. The position of the intake valve 152 and exhaust valve 154 may be determined by position sensors 155 and 157, respectively. In alternative examples, the intake valve 152 and/or exhaust valve 154 may be controlled by electric valve actuation. For example, the combustion chamber 132 may alternatively include an intake valve controlled via electric valve actuation and an exhaust valve controlled via cam actuation including CPS and/or VCT systems.

A fuel injector 169 is shown coupled directly to combustion chamber 132 for injecting fuel directly therein in proportion to the pulse width of a signal received from the controller 12. In this manner, the fuel injector 169 provides what is known as direct injection of fuel into the combustion chamber 132. The fuel injector may be mounted in the side of the combustion chamber or in the top of the combustion chamber, for example. Fuel may be delivered to the fuel injector 169 by a fuel system including a fuel tank 175, a fuel pump (not shown), and a fuel rail (not shown). In some examples, the combustion chamber 132 may alternatively or additionally include a fuel injector arranged in the intake manifold 144 in a configuration that provides what is known as port injection of fuel into the intake port upstream of the combustion chamber 132. Fuel tank 175 includes a fuel tank level sensor 176 and a pressure sensor 177. Fuel tank level sensor 176 senses an amount of fuel that is stored in fuel tank 175.

Spark is provided to combustion chamber 132 via spark plug 166. The ignition system may further comprise an ignition coil (not shown) for increasing voltage supplied to spark plug 166. In other examples, such as a diesel, spark plug 166 may be omitted.

The intake passage 142 may include a throttle 162 having a throttle plate 164. In this particular example, the position of throttle plate 164 may be varied by the controller 12 via a signal provided to an electric motor or actuator included with the throttle 162, a configuration that is commonly referred to as electronic throttle control (ETC). In this manner, the throttle 162 may be operated to vary the intake air provided to the combustion chamber 132 among other engine cylinders. The position of the throttle plate 164 may be provided to the controller 12 by a throttle position signal. The intake passage 142 may include a mass air flow sensor 120 and a manifold air pressure sensor 122 for sensing an amount of air entering engine 130.

An exhaust gas sensor 127 is shown coupled to the exhaust passage 148 upstream of an emission control device 170 according to a direction of exhaust flow. The sensor 127 may be any suitable sensor for providing an indication of exhaust gas air-fuel ratio such as a linear oxygen sensor or UEGO (universal or wide-range exhaust gas oxygen), a two-state oxygen sensor or EGO, a HEGO (heated EGO), a $NO_x$, HC, or CO sensor. In one example, upstream exhaust gas sensor 127 is a UEGO configured to provide output, such as a voltage signal, that is proportional to the amount of oxygen present in the exhaust. Controller 12 converts oxygen sensor output into exhaust gas air-fuel ratio via an oxygen sensor transfer function.

The emission control device 170 is shown arranged along the exhaust passage 148 downstream of the exhaust gas sensor 127. The device 170 may be a three way catalyst (TWC), NO trap, various other emission control devices, or combinations thereof. In some examples, during operation of the engine 130, the emission control device 170 may be periodically reset by operating at least one cylinder of the engine within a particular air-fuel ratio.

The controller 12 is shown in FIG. 3 as a microcomputer, including a microprocessor unit 102, input/output ports 104, an electronic storage medium for executable programs and calibration values shown as read only memory chip 106 (e.g., non-transitory memory) in this particular example, random access memory 108, keep alive memory 110, and a data bus. The controller 12 may receive various signals from sensors coupled to the engine 130, in addition to those signals previously discussed, including measurement of inducted mass air flow (MAF) from the mass air flow sensor 120; engine coolant temperature (ECT) from a temperature sensor 123 coupled to a cooling sleeve 114; an engine position signal from an engine position sensor 118 (or other type) sensing a position of crankshaft 140; throttle position from a throttle position sensor 165; and manifold absolute pressure (MAP) signal from the sensor 122. An engine speed signal may be generated by the controller 12 from engine position sensor 118. Manifold pressure signal also provides an indication of vacuum, or pressure, in the intake manifold 144. Note that various combinations of the above sensors may be used, such as a MAF sensor without a MAP sensor, or vice versa. During engine operation, engine torque may be inferred from the output of MAP sensor 122 and engine speed. Further, this sensor, along with the detected engine speed, may be a basis for estimating charge (including air) inducted into the cylinder. In one example, the engine position sensor 118, which is also used as an engine speed sensor, may produce a predetermined number of equally spaced pulses every revolution of the crankshaft.

The storage medium read-only memory 106 can be programmed with computer readable data representing non-transitory instructions executable by the processor 102 for performing at least portions of the methods described below as well as other variants that are anticipated but not specifically listed. Thus, controller 12 may operate actuators to change operation of engine 130. In addition, controller 12 may post data, messages, and status information to human/machine interface 113 (e.g., a touch screen display, heads-up display, light, etc.).

During operation, each cylinder within engine 130 typically undergoes a four stroke cycle: the cycle includes the intake stroke, compression stroke, expansion stroke, and exhaust stroke. During the intake stroke, generally, the exhaust valve 154 closes and intake valve 152 opens. Air is introduced into combustion chamber 132 via intake manifold 144, and piston 136 moves to the bottom of the cylinder so as to increase the volume within combustion chamber 132. The position at which piston 136 is near the bottom of the cylinder and at the end of its stroke (e.g. when combustion chamber 132 is at its largest volume) is typically referred to by those of skill in the art as bottom dead center (BDC).

During the compression stroke, intake valve 152 and exhaust valve 154 are closed. Piston 136 moves toward the cylinder head so as to compress the air within combustion chamber 132. The point at which piston 136 is at the end of its stroke and closest to the cylinder head (e.g. when combustion chamber 132 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 166, resulting in combustion.

During the expansion stroke, the expanding gases push piston 136 back to BDC. Crankshaft 140 converts piston movement into a rotational torque of the rotary shaft. Finally, during the exhaust stroke, the exhaust valve 154 opens to release the combusted air-fuel mixture to exhaust passage 148 and the piston returns to TDC. Note that the above is shown merely as an example, and that intake and exhaust valve opening and/or closing timings may vary, such as to provide positive or negative valve overlap, late intake valve closing, or various other examples.

As described above, FIG. 1 shows only one cylinder of a multi-cylinder engine, and each cylinder may similarly include its own set of intake/exhaust valves, fuel injector, spark plug, etc. Referring now to FIG. 2, a block diagram of an example evaporative emissions system 200 is shown. Evaporative emissions system 200 includes a canister purge valve 202, a carbon filled fuel vapor storage canister 204, a canister vent valve 206, a fuel tank pressure sensor 177, a fuel tank level sensor 176, a fuel cap 230, a fuel tank pressure control valve 212, and a refueling valve 214. In some examples, a leak detection module including a pump and change over valve may replace vent valve 206. Carbon filled fuel vapor storage canister 204 may include activated carbon 211 to store fuel vapors. Fuel tank pressure control valve 212 and refueling valve 214 are shown coupled to carbon filled fuel vapor storage canister 204 and fuel tank 220 via conduit 233. Fuel may flow from fuel cap 230 to fuel tank 220 via filler neck pipe 231.

The system of FIGS. 1 and 2 provides for a vehicle system, comprising: an engine including a fuel injector; a fuel tank including a fuel level sensor and a pressure sensor; a carbon filled fuel vapor storage canister; a canister purge valve; and a controller including executable instructions stored in non-transitory memory that cause the controller to estimate a concentration of fuel vapor stored in the carbon filled fuel vapor storage canister according to an amount of fuel delivered to refill the fuel tank and a pressure in the fuel tank. In a first example, the vehicle system further comprises additional instructions that cause the controller to adjust the fuel injector in response to the concentration of fuel vapor stored in the carbon filled fuel vapor storage canister. In a second example that may include the first example, the vehicle system further comprises additional instructions that cause the controller to adjust the canister purge valve in response to the concentration of fuel vapor stored in the carbon filled fuel vapor storage canister. In a third example that may include one or both of the first and second examples, the vehicle system further comprises additional instructions to adjust the concentration of fuel vapor stored in the carbon filled fuel vapor storage canister while the engine is running. In a fourth example that may include one or more of the first through third examples, the vehicle system further comprises additional instructions that cause the controller to adjust the canister purge valve according to the concentration of fuel vapor stored in the carbon filled fuel vapor storage canister in response to conditions being present to purge the carbon filled fuel vapor storage canister of fuel vapors. In a fifth example that may include one or more of the first through fourth examples, the vehicle system includes where the amount of fuel delivered to refill the fuel tank is based on output of a fuel tank level sensor.

Referring now to FIG. 3, an example prior art sequence where a concentration of fuel vapors stored in a carbon filled fuel vapor storage canister is learned is shown. In one example, the concentration of fuel vapors stored in the carbon filled fuel vapor storage canister are learned by applying feedback from an oxygen sensor in an exhaust system of an engine. In particular, a concentration of fuel vapors stored in a carbon filled fuel vapor storage canister is determined based on an integrated difference between a reference Lambda value (e.g., Lambda=air-fuel ratio/stoichiometric air-fuel ratio) and an actual or measured Lambda value. In one example, the concentration of fuel vapors stored in the carbon filled fuel vapor storage canister may be stored in a variable p_comp.

The first plot from the top of FIG. 3 is a plot of a learned concentration of fuel vapors stored in the carbon filled canister versus time. The amount of the learned concentration of fuel vapors stored in the carbon filled canister increases in the direction of the vertical axis arrow. The amount of learned fuel vapors at the level of the horizontal axis is zero. The horizontal axis represents time and time increases from the left side of the plot to the right side of the plot. Trace 302 represents the amount of learned concentration of fuel vapors.

The second plot from the top of FIG. 3 is a plot of an amount of fuel injected to the engine versus time. The amount of fuel injected to the engine increases in the direction of the vertical axis arrow. The amount of fuel injected to the engine at the level of the horizontal axis is zero. The horizontal axis represents time and time increases from the left side of the plot to the right side of the plot. Trace 304 represents the amount of fuel injected to the engine.

The first and second plots from the top of FIG. 3 are time aligned. In addition, the time scales between FIG. 3 and FIG. 4 are equivalent so that a comparison may be made between FIGS. 3 and 4.

At time t0, an engine is running (not shown) at a constant speed and load. Fuel is injected to the engine. Fuel vapors from the carbon filled fuel vapor storage canister are not permitted to flow into the engine.

At time t1, fuel vapors are permitted to flow into the engine and the learned concentration of fuel vapors flowing from the carbon filled fuel vapor storage canister is zero, but the learned concentration begins increasing shortly after time t1. The amount of fuel injected to the engine is equal to the amount of fuel that was injected to the engine at time t0, but shortly after time t1 when the learned concentration of fuel vapors stored in the carbon filled increases, the amount of fuel injected is decreased in response to the increase in the learned concentration of fuel vapors increasing.

Between time t1 and time t2, the learned concentration of fuel vapors continues increasing and the amount of fuel injected to the engine continues to decrease. The amount of time between time t1 and time t2 is equivalent to the amount of time between time t11 and time t12 in FIG. 4.

At time t3, the learned concentration of fuel vapors stored in the carbon filled canister reaches a level where it stabilizes. The amount of fuel injected into the engine stabilizes at a lower level and the engine continues to operate at the same speed and load.

Thus, the prior art learning method for learning the concentration of fuel vapors that are stored in the carbon filled fuel vapor storage canister has no knowledge of the concentration of fuel vapors that are stored in the carbon filled canister when fuel vapors just begin to flow to the engine during purging of the carbon filled fuel vapor storage canister. Consequently, it takes a longer amount of time to arrive at a final value for the learned concentration of fuel vapors.

Referring now to FIG. 4, an example sequence where a concentration of fuel vapors stored in a carbon filled fuel vapor storage canister is learned according to the method of FIG. 7 is shown. The concentration of fuel vapors stored in the carbon filled fuel vapor storage canister are learned by applying feedback from an oxygen sensor in an exhaust system of an engine, but the concentration of fuel vapors stored in the carbon filled fuel vapor storage canister is also estimated when there is no flow of fuel vapors from the carbon filled fuel vapor storage canister to the engine. The concentration of fuel vapors stored in a carbon filled fuel vapor storage canister is learned when fuel vapors flow from the carbon filled canister to the engine as previously described. In addition, the concentration of fuel vapors stored in the carbon filled canister is also estimated based on fuel tank refilling and pressure in the fuel tank. The concentration of fuel vapors that is estimated when fuel vapors are not flowing from the carbon filled fuel vapor storage canister to the engine is applied to seed the estimate of the concentration of fuel vapors when fuel vapors flow from the carbon filled fuel vapor storage canister to the engine.

The first plot from the top of FIG. 4 is a plot of a learned concentration of fuel vapors stored in the carbon filled canister versus time. The amount of the learned concentration of fuel vapors stored in the carbon filled canister increases in the direction of the vertical axis arrow. The amount of learned fuel vapors at the level of the horizontal axis is zero. The horizontal axis represents time and time increases from the left side of the plot to the right side of the plot. Trace 402 represents the amount of learned concentration of fuel vapors.

The second plot from the top of FIG. 4 is a plot of an amount of fuel injected to the engine versus time. The amount of fuel injected to the engine increases in the direction of the vertical axis arrow. The amount of fuel injected to the engine at the level of the horizontal axis is zero. The horizontal axis represents time and time increases from the left side of the plot to the right side of the plot. Trace 404 represents the amount of fuel injected to the engine.

At time t10, an engine is running (not shown) at a constant speed and load. Fuel is injected to the engine. Fuel vapors from the carbon filled fuel vapor storage canister are not permitted to flow into the engine. The concentration of fuel vapors during purging of the carbon filled canister is zero.

At time T11, fuel vapors are permitted to flow into the engine and the learned concentration of fuel vapors flowing from the carbon filled fuel vapor storage canister is revised to a middle level based on fuel vapor concentration estimates that were determined when fuel vapor did not flow from the carbon filled fuel vapor storage canister to the engine. The learned concentration of fuel vapors begins to increase from the seeded concentration of fuel vapors shortly after time t1 The amount of fuel that is injected to the engine is stepped down in response to equal to the concentration of fuel that is estimated to be stored in the carbon filled fuel vapor storage canister.

Between time t11 and time t12, the learned concentration of fuel vapors continues increasing and the amount of fuel injected to the engine continues to decrease. The amount of time between time t11 and time t12 is equivalent to the amount of time between time t1 and time t3 in the plots shown in FIG. 3.

At time t12, the learned concentration of fuel vapors stored in the carbon filled canister reaches a level where it stabilizes. The amount of fuel injected into the engine stabilizes at a lower level and the engine continues to operate at the same speed and load.

Thus, the method of learning the concentration of fuel vapors that are stored in the carbon filled fuel vapor storage canister according to the present disclosure has knowledge of the concentration of fuel vapors that are stored in the carbon filled canister when fuel vapors just begin to flow to the engine during purging of the carbon filled fuel vapor storage canister. This knowledge is used to seed the concentration of fuel vapors stored in the carbon filled canister at the onset of a purging event. Consequently, it takes a shorter amount of time to arrive at a final value for the learned concentration of fuel vapors. The amount of time between time t2 and time t3 in FIG. 3 is the amount of time saved in this particular example to determine the concentration of fuel vapors that are stored in the carbon filled fuel vapor storage canister.

Referring now to FIG. 5, an example table for storing concentrations of fuel vapors that are stored in a carbon filled fuel vapor storage canister is shown. In this example, table 500 includes a first row 502 and a second row 504. First row 502 includes values of pressure within a vehicle's fuel tank. Second row 504 includes bias values for a carbon filled fuel vapor storage canister (e.g., values that are applied to seed the fuel vapor concentration estimate p_comp). The bias values may be in units of mass, percent (e.g., percent loading), or other units (e.g., mass/volume). The bias values are shown paired with respective pressures in columns (e.g., 510-518) such that bias values may be referenced via a fuel tank pressure. Bias values in the table may be determined via weighing a carbon filled fuel vapor storage canister that is not loaded with fuel vapors, measuring pressure within the fuel tank, releasing fuel vapors from the fuel tank to the carbon filled canister by opening a fuel tank pressure control valve (e.g., 212) to relieve the pressure in the fuel tank, and determining an increase in weight of the carbon filled canister after the pressure in the fuel tank has been reduced by opening the fuel tank pressure control valve. The weight increase may be applied to the table as a mass, or mass per volume of the carbon filled canister, or a percent canister load. The mass, mass/volume, or percentage load may be subsequently converted to a mass flow rate or concentration of fuel flow (e.g., grams/liter of air) into the engine using a table or function that describes mass flow rate of fuel out of the canister as a function of fuel vapor mass stored in the carbon filled fuel vapor storage canister, canister purge valve duty cycle and pressure drop across the carbon filled fuel vapor storage canister. Table 500 may be referenced or indexed via a fuel tank pressure and table 500 outputs a bias value.

Referring now to FIG. 6, an example table for storing concentrations of fuel vapors that are stored in a carbon filled fuel vapor storage canister is shown. In this example, table 600 includes a first row 602 and a second row 604. First row 602 includes values of amounts of fuel that is added to a fuel tank during refilling. Second row 604 includes bias values for a carbon filled fuel vapor storage canister (e.g., values that are applied to seed the fuel vapor concentration estimate p_comp). The bias values may be in units of mass, percent (e.g., percent loading), or other units (e.g., mass/volume). The bias values are shown paired with respective fuel refill amounts in columns (e.g., 610-618) such that bias values may be referenced via an amount of fuel that is added to a fuel tank during refilling of the fuel tank. Bias values in the table may be determined via weighing a carbon filled fuel vapor storage canister that is not loaded with fuel vapors, measuring an amount of fuel that is added to a fuel tank, flowing fuel vapors from the fuel tank to the carbon filled fuel vapor storage canister while the fuel tank is being filled, and determining an increase in weight of the carbon filled canister after the fuel tank refilling has ceased. The weight increase may be applied to the table as a mass, or mass per volume of the carbon filled canister, or a percent canister load. The mass, mass/volume, or percentage load may be subsequently converted to a mass flow rate or concentration of fuel flow (e.g., grams/liter of air) into the engine using a table or function that describes mass flow rate of fuel out of the canister as a function of fuel vapor mass stored in the carbon filled fuel vapor storage canister, canister purge valve duty cycle and pressure drop across the carbon filled fuel vapor storage canister. Table 600 may be referenced or indexed via a fuel tank fuel refill amount and table 600 outputs a bias value.

Referring now to FIG. 7, an example method 700 for operating an evaporative emissions system is shown. At least portions of method 700 may be included in and cooperate with a system as shown in FIGS. 1 and 2 as executable instructions stored in non-transitory memory. The method of FIG. 7 may cause the controller to actuate the actuators in the real world and receive data and signals from sensors described herein when the method is realized as executable instructions stored in controller memory.

At 702, method 700 determines vehicle operating conditions. Vehicle operating conditions may include but are not limited to a total distance travelled by the vehicle, engine temperature, ambient temperature, vehicle speed, a fuel level in a fuel tank (e.g., an amount of fuel that is stored in the fuel tank), fuel tank pressure, and engine state (e.g., combusting fuel/not combusting fuel). Method 700 proceeds to 704.

At 704, method 700 judges if conditions are present for venting fuel vapors in a fuel tank to a carbon filled fuel vapor storage canister. In one example, method 700 may judge that conditions are present for venting fuel vapors in the fuel tank to the carbon filled fuel vapor storage canister when pressure in the fuel tank exceeds a threshold pressure. Additionally, method 700 may require that fuel vapors are not being delivered to the engine from the carbon filled fuel vapor storage canister. If method 700 judges that conditions are present for venting fuel vapors in a fuel tank to a carbon filled fuel vapor storage canister, the answer is yes and method 700 proceeds to 730. Otherwise, the answer is no and method 700 proceeds to 706.

At 730, method 700 estimates a concentration of fuel vapor that will be add to the carbon filled fuel vapor storage canister. In one example, method 700 determines a pressure in a fuel tank and applies the fuel tank pressure to reference a table or a function that outputs a concentration of fuel vapor that will be stored in a carbon filled fuel vapor storage canister due to venting the fuel tank to the carbon filled fuel vapor storage canister. The amount of fuel that will be added to the carbon filled fuel vapor storage canister may be referred to as a bias value. Method 700 proceeds to 732.

At 732, method 700 vents the fuel tank to the carbon filled fuel vapor storage canister. In one example, method 700 opens the fuel tank pressure control valve and the canister vent valve to vent fuel vapors from the fuel tank into the carbon filled fuel vapor storage canister. Method 700 proceeds to 734.

At 734, method 700 adds the concentration of fuel vapor to a running total of a concentration of fuel vapor stored in the carbon filled fuel vapor storage canister. The addition may be expressed via the following equation:

$$\text{Fuel\_can\_con} = \text{Fuel\_tank\_con} + \text{Fuel\_can\_con\_old} \qquad \text{eq. (1)}$$

where Fuel_can_con is a running total of the concentration of fuel vapors that are stored in the carbon filled fuel vapor storage canister, Fuel_can_con_old is the total concentration of fuel vapors that were stored in the carbon filled fuel vapor storage canister the last most recent time method 700 executed, and Fuel_tank_con is a concentration of fuel vapors that were added to the carbon filled fuel vapor storage canister by venting pressure in the fuel tank. Method 700 makes Fuel_can_con_old=Fuel_can_con once Fuel_can_con is updated for the present execution cycle of method 700. Method 700 proceeds to 706.

At 706, method 700 judges whether or not the fuel tank is being refilled with fuel. Method 700 may judge that the fuel tank is being refilled with fuel when the fuel tank level sensor indicates that the fuel level in the fuel tank is increasing. If method 700 judges that the fuel tank is being refilled, the answer is yes and method 700 proceeds to 740. Otherwise, the answer is no and method 700 proceeds to 708. Additionally, method 700 may require that fuel vapors are not being delivered to the engine from the carbon filled fuel vapor storage canister. Method 700 also stores to memory the amount of fuel that is being held in the fuel tank at the time it is determined that the fuel tank is being refilled. In this way, the initial amount of fuel in the fuel tank may be determined. The refueling valve and the vent valve are held open while the fuel is added to the tank so that fuel vapors do not flow to the atmosphere.

At 740, method 700 estimates the change in volume of fuel that is stored in the fuel tank. Specifically, method 700 determines an amount of fuel within the fuel tank after refilling of the fuel tank ceases and method 700 subtracts the initial amount of fuel that was in the fuel tank at the onset of fuel tank refilling to determine the change in volume of fuel that is held in the fuel tank. Method 700 proceeds to 742.

At 742, method 700 estimates a concentration of fuel vapor that was added to the carbon filled fuel vapor storage canister during refilling of the fuel tank. In one example, method 700 applies the amount of fuel that was added to the fuel tank during refilling to reference a table or a function that outputs a concentration of fuel vapor stored in a carbon filled fuel vapor storage canister as a bias value (e.g., table 600). Method 700 proceeds to 744.

At 744, method 700 adds the concentration of fuel vapor to a running total of a concentration of fuel vapor stored in the carbon filled fuel vapor storage canister. The addition may be expressed via the following equation:

$$\text{Fuel\_can\_con} = \text{Fuel\_tank\_refil\_con} + \text{Fuel\_can\_con\_old} \qquad \text{eq. (2)}$$

where Fuel_can_con is a running total of the concentration of fuel vapors that are stored in the carbon filled fuel vapor storage canister, Fuel_can_con_old is the value of Fuel_can_con from the last most recent execution cycle of method 700, and Fuel_tank_refil_con is a concentration of fuel vapors that were added to the carbon filled fuel vapor storage canister by adding fuel to the fuel tank. Method 700 proceeds to 708.

At 708, method 700 judges whether or not conditions are present to purge fuel vapors from the carbon filled fuel vapor storage canister. In one example, conditions may be present to purge the carbon filled fuel vapor storage canister include when the engine is running (e.g., rotating and combusting fuel), when the engine is operating at part load, and when an amount of fuel vapor stored in the carbon filled canister is greater than a threshold amount of fuel. If method 700 judges that conditions are present to purge fuel vapors from the carbon filled fuel vapor storage canister, the answer is yes and method 700 proceeds to 710. Otherwise, the answer is no and method 700 proceeds to exit.

At 710, method 700 determines a concentration of fuel vapors stored within the carbon filled fuel vapor storage canister. Method 700 may determine the concentration via retrieving the value of the variable Fuel_can_con from controller memory. The variable Fuel_can_con is a summation of fuel vapor concentrations added to the carbon filled fuel vapor storage canister each time the fuel tank is vented and each time the fuel tank is refilled. The variable Fuel_can_con is zeroed each time the fuel vapor storage canister is purged of fuel vapors. Method 700 proceeds to 712.

At 712, method 700 adjusts the initial value of the concentration of fuel vapors supplied from the carbon filled fuel vapor storage canister to the engine (e.g., p_comp_old) to the value of the variable Fuel_can_con during a first iteration of step 712 following beginning of a carbon canister purge cycle (e.g., when the canister purge valve is initially opened to purge the carbon filled fuel vapor storage canister of fuel vapors). Method 700 skips step 712 and proceeds to step 714 once the first iteration of step 712 is performed during a carbon filled canister purge cycle. Step 712 may be performed again once method 700 exits a carbon filled canister purge cycle after fuel vapors are purged from the carbon filled fuel vapor storage canister. Method 700 proceeds to 714.

At 714, method 700 determines an amount of fuel that is supplied to the engine's cylinders. In one example, method 700 includes a closed loop proportional and integral (PI) controller to adjust an equivalence ratio of the engine (e.g., Lambda) based on feedback from an oxygen sensor such that the equivalence ratio oscillates about a stoichiometric air-fuel ratio (e.g., 1) during nominal engine operating conditions (e.g., the engine is at operating temperature and operating within a predetermined speed and load range). The PI controller outputs a variable Lambse that represents the engine's desired Lambda value. Method 700 also determines a desired engine fuel amount (Fd), or alternatively, a desired engine air amount (MAF) based on a driver demand torque or power. The desired engine fuel amount or desired engine air amount may be determined via functions or via look-up tables and the other of the two values (e.g., the air amount or the fuel amount) may be determined via the following equation:

$$F_d = \frac{MAF}{Lambse \cdot AFd} \quad \text{eq. (3)}$$

where Fd is the engine fuel amount or desired engine fuel amount, MAF is the engine air amount or desired engine air amount, Lambse is the output of the PI controller, and AFd is the desired engine air-fuel ratio. Method 700 proceeds to 716.

At 716, method 700 supplies fuel to the engine via the carbon filled fuel vapor storage canister and method 700 adjusts the amount of fuel injected in response to the concentration of fuel vapors stored in the carbon filled fuel vapor storage canister. In particular, method 700 may determine the concentration of fuel entering the engine via the following equation:

$$p\_comp = \frac{(Lambse(k) - 1) + (Lambse(k+1) - 1)}{2} \cdot dt + p\_comp\_old \quad \text{eq. (4)}$$

where p_comp is the learned concentration of fuel entering the engine via the carbon filled fuel vapor storage canister, Lambse is the requested engine equivalence ratio, k is the $k^{th}$ Lambse value, k+1 is the $k^{th}$+1 Lambse value, dt is the amount of time between Lambse samples, and p_comp_old is the last most recent value of p_comp. Equation 4 may be determined each time method 700 is executed so that p_comp is the integrated value of Lambse −1. Method 700 has seeded the p_comp_old value at step 712 so the first time step 716 executes during purging of a carbon filled fuel vapor storage canister, the value of p_comp will be at least the value of the variable Fuel_can_con. The variable p_comp_old is set equal to the value of p_comp once the value of p_comp has been determined. The amount of fuel delivered to the engine may be determined via the following equation:

$$F_{dmod} = F_d - p\_comp \quad \text{eq. (5)}$$

where $F_{dmod}$ is the desired modified fuel amount that is to be delivered to the engine, $F_d$ is the desired amount of fuel to be supplied to the engine, and p_comp is the concentration of fuel entering the engine from the carbon filled fuel canister. The amount of fuel injected to the engine may be adjusted via adjusting the engine's fuel injectors to deliver the amount of fuel $F_{dmod}$. Method 700 proceeds to exit.

In this way, a fuel concentration may be determined when fuel vapors are not flowing to an engine from a carbon filled fuel vapor storage canister. The fuel concentration may be subsequently applied to reduce an amount of time it takes to lean an actual fuel concentration that is being supplied to an engine via a carbon filled fuel vapor storage canister.

The method of FIG. 7 provides for a method for operating an evaporative emissions system, comprising: estimating a concentration of fuel vapors stored in a carbon filled fuel vapor storage canister via a controller based on conditions when fuel vapors from the carbon filled fuel vapor storage canister do not flow to an engine; and adjusting operation of an engine via the controller according to the concentration of fuel vapors. In a first example, the method includes where adjusting operation of the engine includes adjusting a canister purge valve. In a second example that may include the first example, the method includes where adjusting operation of the engine includes adjusting a fuel injector. In a third example that may include one or both of the first and second example, the method includes where the concentration is estimated based on a fuel tank pressure. In a fourth example that may include one or more of the first through third examples, the method includes where the concentration is estimated based on an amount of fuel added to a fuel tank. In a fifth example that may include one or more of the first through fourth examples, the method includes where estimating the concentration of fuel vapors includes summing fuel vapor concentration estimates from a plurality of events where pressure is relieved from a fuel tank. In a sixth example that may include one or more of the first through fifth examples, the method includes where estimating the concentration of fuel vapors includes summing fuel vapor concentration estimates from a plurality of events where fuel is added to a fuel tank. In a seventh example that may include one or more of the first through sixth examples, the method further comprises subtracting the concentration of fuel vapors from a requested engine fuel amount to generate a modified requested engine fuel amount. In a eighth example that may include one or more of the first through seven examples, the method further comprises adjusting an amount of fuel injected via a fuel injector in response to the modified requested engine fuel amount.

The method of FIG. 7 also provides for a method for operating an evaporative emissions system, comprising: adjusting a position of a canister purge valve at a beginning of purging fuel vapors from a carbon filled fuel vapor storage canister via a controller in response to an output of a fuel tank level sensor. In a first example, the method includes where the output of the fuel tank level sensor indicates an amount of fuel added to a fuel tank during a fuel tank refilling event. In a second example that may include the first example, the method further comprises adjusting a fuel injector to compensate for adjusting the position of the canister purge valve. In a third example that may include one or both of the first and second examples, the method further comprises estimating a fuel vapor concentration based on the output of the fuel tank level sensor. In a fourth example that may include one or more of the first through third examples, the method further comprises adjusting the canister purge valve at the beginning of purging fuel vapors from the carbon filled fuel vapor storage canister in further response to output of a fuel tank pressure sensor.

Note that the example control and estimation routines included herein can be used with various engine and/or vehicle system configurations. Further, the methods described herein may be a combination of actions taken by a controller in the physical world and instructions within the controller. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for operating an evaporative emissions system, comprising:
    operating with fuel vapors from a carbon filled fuel vapor storage canister not flowing to an engine;
    estimating a concentration of fuel vapors stored in the carbon filled fuel vapor storage canister via a controller based on conditions when fuel vapors from the carbon filled fuel vapor storage canister do not flow to the engine, where the estimating the concentration of fuel vapors is based on fuel vapor concentration estimates from a plurality of events where pressure is reduced in a fuel tank or a plurality of events where fuel is added to a fuel tank; and
    adjusting operation of the engine via the controller according to the concentration of fuel vapors.

2. The method of claim 1, where adjusting operation of the engine includes adjusting a canister purge valve.

3. The method of claim 1, where adjusting operation of the engine includes adjusting a fuel injector.

4. The method of claim 1, where the concentration of fuel vapors is estimated based on a fuel tank pressure, and where the fuel tank includes a pressure sensor.

5. The method of claim 1, where the concentration of fuel vapors is estimated based on an amount of fuel added to a fuel tank, and where the fuel tank includes a fuel level sensor.

6. The method of claim 1, further comprising subtracting the concentration of fuel vapors from a requested engine fuel amount to generate a modified requested engine fuel amount.

7. The method of claim 6, further comprising adjusting an amount of fuel injected via a fuel injector in response to the modified requested engine fuel amount.

8. A method for operating an evaporative emissions system, comprising:
    estimating a concentration of fuel vapors stored in a carbon filled fuel vapor storage canister via a controller based on conditions when fuel vapors from the carbon filled fuel vapor storage canister do not flow to an engine, where the estimating the concentration of fuel vapors includes summing fuel vapor concentration estimates from a plurality of events where pressure is relieved from a fuel tank; and
    adjusting operation of the engine via the controller according to the concentration of fuel vapors.

9. The method of claim 8, where estimating the concentration of fuel vapors includes summing fuel vapor concentration estimates from a plurality of events where fuel is added to a fuel tank.

* * * * *